(12) United States Patent
Weber et al.

(10) Patent No.: US 10,054,242 B2
(45) Date of Patent: Aug. 21, 2018

(54) VALVE AND VALVE ASSEMBLY

(71) Applicant: Buerkert Werke GmbH, Ingelfingen (DE)

(72) Inventors: Christian Weber, Kupferzell (DE); Markus Klaiber, Niedernhall (DE); Uwe Gruebnau, Dresden (DE)

(73) Assignee: Buerkert Werke GmbH, Ingelfingen (DE)

( * ) Notice: Subject to any disclaimer, the term of this patent is extended or adjusted under 35 U.S.C. 154(b) by 71 days.

(21) Appl. No.: 15/077,977

(22) Filed: Mar. 23, 2016

(65) Prior Publication Data

US 2016/0298782 A1   Oct. 13, 2016

(30) Foreign Application Priority Data

Apr. 10, 2015   (DE) .......................... 10 2015 105 497

(51) Int. Cl.
  *F16K 31/06* (2006.01)
  *F16K 27/02* (2006.01)

(52) U.S. Cl.
  CPC ........ *F16K 31/0627* (2013.01); *F16K 27/029* (2013.01)

(58) Field of Classification Search
  CPC ............... F16K 27/029; F16K 31/0627; Y10T 137/86622
  USPC ................................ 137/625.65; 251/129.03
  See application file for complete search history.

(56) References Cited

U.S. PATENT DOCUMENTS

| | | | | | |
|---|---|---|---|---|---|
| 891,568 | A | * | 6/1908 | Runnion | ................. F16K 17/00 251/129.03 |
| 2,612,907 | A | * | 10/1952 | Harris | ................... F16K 11/044 137/625.65 |
| 2,829,861 | A | * | 4/1958 | Wright | ................ F16K 31/0655 251/129.03 |
| 3,351,093 | A | * | 11/1967 | Frantz | ................. F16K 31/0606 251/129.03 |
| 3,377,046 | A | * | 4/1968 | Frantz | ................. F16K 31/0606 137/625.65 |
| 3,972,505 | A | * | 8/1976 | Padula | ................ F16K 31/0627 137/625.65 |
| 4,344,603 | A | * | 8/1982 | Hozumi | .............. F16K 31/0606 251/129.03 |
| 4,501,299 | A | * | 2/1985 | Klimowicz | ......... F16K 31/0606 251/129.03 |

(Continued)

FOREIGN PATENT DOCUMENTS

DE        10256165 A1     8/2003

OTHER PUBLICATIONS

German Search Report dated Jan. 26, 2016 from corresponding German Application No. 10 2015 105 497.3, 7 pages.

*Primary Examiner* — Eric Keasel
(74) *Attorney, Agent, or Firm* — Dilworth IP, LLC

(57) ABSTRACT

A valve comprises a valve housing with at least one fluid port. In the valve housing a valve chamber is formed, in which a closing element axially shiftable by a valve drive is provided, which cooperates with at least one valve seat provided in the valve housing. The valve housing has a first end face to which the valve drive can be coupled, and at least one actuation opening in a second end face of the valve housing opposite to the first end face. The actuation opening extends through the valve housing up to the closing element and is arranged eccentrically in the second end face.

20 Claims, 3 Drawing Sheets

(56) References Cited

U.S. PATENT DOCUMENTS

| | | | | | |
|---|---|---|---|---|---|
| 5,967,186 | A | * | 10/1999 | Grueninger | ......... F16K 31/0606 251/129.03 |
| 6,786,237 | B2 | * | 9/2004 | Yajima | ................ F15B 13/0402 137/625.65 |
| 6,959,910 | B2 | * | 11/2005 | Matsumoto | ......... F16K 31/0627 251/129.03 |
| 8,074,961 | B2 | * | 12/2011 | Clauss | ................ F16K 31/0658 251/129.03 |

* cited by examiner

VALVE AND VALVE ASSEMBLY

FIELD OF THE INVENTION

This invention relates to a valve, in particular a cartridge valve, and to a valve assembly.

BACKGROUND

In general, valves are used for controlling or regulating a fluid which flows through the valve. In dependence on the field of use of the valve and the requirements which are placed on the valve, a valve is used in a particular design. A typical design is a cartridge valve which is characterized by a multi-part structure and its compact construction.

Typically, a cartridge valve is a directional seat valve or a directional gate valve comprising a valve drive and a valve housing, which are directly coupled with each other. In the valve housing a valve chamber is formed, which is in flow connection with at least two fluid ports, wherein the at least two fluid ports are an inlet and an outlet. Via the fluid ports a fluid to be controlled or regulated can be supplied to the valve. The flow rate can be set by an adjustable closing element arranged in the valve chamber, before it again flows out of the valve. In a cartridge valve the closing element typically is formed separate from the valve drive and is inserted into the valve housing. During assembly of the valve, when the valve drive is coupled with the valve housing, the closing element is aligned via internal stops and surfaces as well as the valve drive.

It was found out, however, that aligning the closing element during assembly is susceptible to faults. Furthermore, due to the compact construction of the cartridge valve little space is available which a fitter or operator of the cartridge valve can utilize when he wants to manually make settings at the closing element.

It is the object of the invention to provide a valve, in particular a cartridge valve, with which a manual actuation is possible in a simple way.

SUMMARY

The invention provides a valve, comprising a valve housing with at least one fluid port, wherein in the valve housing a valve chamber is formed, in which a closing element axially shiftable by a valve drive is at least partly provided, which cooperates with at least one valve seat provided in the valve housing, and wherein the valve housing includes a first end face to which the valve drive can be coupled, and at least one actuation opening in a second end face of the valve housing opposite to the first end face, which extends through the valve housing up to the closing element and is arranged eccentrically in the second end face.

The idea underlying the invention is to provide an actuation opening at the compact valve housing, via which a fitter can align the valve on installation in a receiving body and furthermore an operator later on can operate the valve from outside. For this purpose, the actuation opening is arranged on the side of the valve housing opposite to the valve drive, so that the access to the actuation opening is easy for the operator, even if the valve has been assembled already. Via the actuation opening the fitter easily can align the valve from outside in circumferential direction relative to a receiving body which has inflow and outflow channels for the valve as well as a receiving opening for the valve. After the assembly, a pin-like operating element is introduced via the actuation opening, which extends up to the closing element and can manually shift the same. Thus, the actuation opening not only represents an actuation, but also an alignment opening, via which the valve is erected in a receiving opening of a receiving body, e.g. a mounting block, in direction of rotation, therefore the eccentric position of the actuation opening, around the central longitudinal axis. Accordingly, the actuation opening provides for at least two different functions at the same time. A central arrangement of the actuation opening merely would lead to the fact that the operator might axially shift the closing element.

Via the at least one actuation opening a fluid provided in the valve chamber optionally can flow out, as the actuation opening is in flow connection with the valve chamber, in order to provide for the access to the closing element. In this case, the actuation opening hence also represents a fluid port and is characterized by the fact that it additionally can be used for manually actuating or for manually aligning the closing element. The at least one actuation opening can be sealed, if this is desired.

According to one aspect, the fluid port is centrically arranged on the second end face, which in the closed condition is closed by the closing element. Accordingly, at least two openings are provided on the second end face of the valve housing, which also can be the underside of the valve, of which one opening is an actuation opening and another opening is a fluid port which is in flow connection with the valve chamber.

In particular, the valve housing includes at least one first flow channel which extends parallel to the shifting direction of the closing element and/or at least one second flow channel which extends vertically to the shifting direction of the closing element. By this arrangement of the flow channels a compact construction of the valve housing can be achieved, which is typical for a cartridge valve. Furthermore, the fluid ports thereby can be arranged on different surfaces of the valve housing, in particular on an end face and the shell surface of the valve housing.

According to one embodiment, the valve housing comprises an insert element and a valve body which has a receptacle in which the insert element is inserted and which in particular partly defines the valve chamber. According to this embodiment, the valve housing has an at least two-part construction, so that different insert elements can be used for different purposes. Since the receptacle of the valve body at least partly forms the valve chamber, when the insert element is accommodated, the volume of the valve chamber can be determined by the size of the insert element. The insert element accordingly defines the valve chamber at least in part. The valve drive to be coupled to the valve housing is coupled to the valve body.

In particular, the at least one first flow channel is formed in the insert element and/or the at least one second flow channel is formed in the valve body. Accordingly, the fluid port formed on the second end face likewise is arranged in the insert element, so that the same is aligned with the first flow channel. Via the first flow channel the fluid port provided on the second end face is flow-connected with the valve chamber, so that through the same a fluid can flow into the valve chamber or can flow out of the valve chamber. By the configuration of the insert element different directional valves can be realized, for example a 3/2-way valve, a 3/3-way valve or a 2/2-way valve.

A further aspect provides that the at least one actuation opening is provided in the insert element and extends up to the valve chamber. The actuation opening extends through the entire insert element which with its surface associated to the valve drive partly defines the valve chamber. For different applications, insert elements with different actuation openings, in particular in terms cross-section or number, accordingly can be provided.

Furthermore, the closing element can include a first portion and a second portion, wherein the first portion is formed centrally and symmetrically and can contact the valve seat. The first portion of the closing element can be used for controlling and regulating the fluid. At the opposite and of the at least one first flow channel the at least one valve seat is provided, which in a closed position is closed by the closing element, in particular by the first portion. The first portion of the closing element extends at least up to the surface of the closing element associated to the valve seat. The first portion of the closing element thus seals the valve seat in a closed position. The second portion encloses the first portion at least like a jacket.

A further aspect provides that the first portion is formed of a first material and the second portion is formed of a second material, wherein the materials in particular have a different elasticity. Various properties thereby can be realized on the one closing element. The first portion which interacts with the fluid typically has a higher elasticity, so that it is compliant. For example, the first portion can be formed of a sealing material which typically is used for a valve seal. A good sealing effect can be achieved thereby. The second portion, which at least partly surrounds the first portion, can be formed of a stiffer material. This is advantageous because the second portion thereby provides the entire closing element with a stiffness and is at least partly aligned with the actuation opening, no that the operator can contact the second portion via an operating device and the actuation opening, in order to actuate the closing element in the valve housing.

Furthermore, the closing element can include at least one coupling element which cooperates with the valve drive, in order to shift the closing element. In particular, there are provided several coupling elements which are symmetrically distributed on a surface of the closing element associated to the valve drive and vertically protrude from this surface. As due to the compact construction the closing element is arranged in the valve housing, there can be provided coupling elements via which the closing element is actuated by a valve drive to be coupled thereto. By the plurality of symmetrically distributed coupling elements it is ensured that the force exerted by the valve drive is homogeneously transmitted to the closing element, so that the closing element does not tilt on shifting.

Alternatively, the at least one coupling element can be formed on the valve drive and act directly on the closing element.

According to one embodiment, the valve housing includes two valve seats between which the closing element is arranged so as to be axially shiftable. The one closing element thus can cooperate with two different valve seats, so that two closed positions are provided. The two valve seats in particular can be arranged directly opposite each other. On the one hand, a valve with extremely fast switching times can be formed thereby, since the closing element is shifted between a first closed position, an open position and a second closed position, when it is moved from the first valve seat to the second valve seat. On the other hand, with such a valve two different fluids can be mixed or processed in the valve chamber. In general, the valve thus can take two switching positions.

One aspect provides that the closing element is pretensioned into a starting position by a spring element, in particular such that the closing element is urged against a valve drive. It thereby is ensured that the valve drive is coupled with the closing element. Furthermore, the closing element among other things can have a fail-safe position into which it returns due to the mechanical pretension, inter alia when a problem exists, for example a power failure.

The valve according to the invention comprises a valve drive.

In particular, the valve drive can be an electromagnetic drive which comprises a coil and a movable armature which cooperates with the closing element. An electromagnetic drive has a high efficiency. Furthermore, fast switching times can be achieved with an electromagnetic drive.

According to a further aspect the valve has a diameter between 2 mm and 15 mm, in particular 9 mm, and a length between 5 mm and 30 mm, in particular 19.7 mm. These dimensions reveal the compact shape of the valve, which is typical for a cartridge valve.

This invention in addition relates to a valve assembly, comprising a valve according to the invention and a receiving body which includes a receiving opening for the valve as well as valve fluid ports. The receiving body has a combined alignment and actuation opening, which in the aligned condition of the valve within the receiving opening is aligned with the actuation opening of the valve.

DETAILED DESCRIPTION

Figure 1:
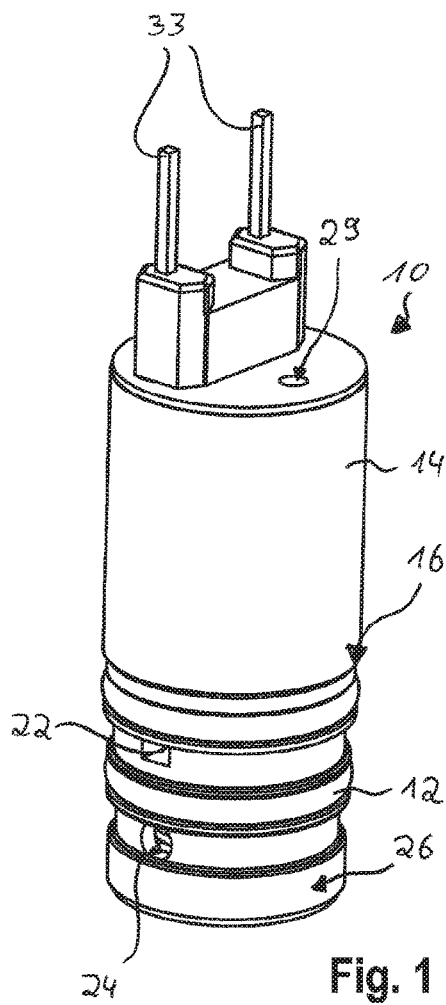
FIG. 1 shows a first perspective view of the valve according to the invention.
Figure 2:
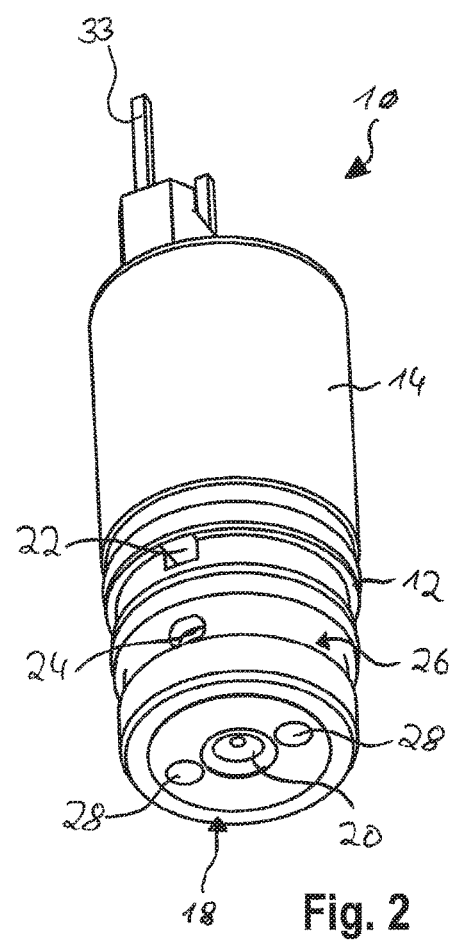
FIG. 2 shows a second perspective view of the valve according to the invention.

FIGS. 1 and 2 show a valve 10 in two different perspective views. In the illustrated embodiment the valve 10 comprises a substantially cylindrical valve housing 12 and a valve drive 14 formed separately, which likewise is cylindrical.

The valve housing 12 includes a first end face 16 via which the valve drive 14 is coupled with the valve housing 12. Furthermore, the valve housing 12 includes a second end face 18 which is opposite to the first end face 16.

In the embodiment shown, the valve housing 12 has three fluid ports 20, 22, 24 (see FIG. 2) which can be in flow connection with each other, as will yet be explained below.

The first fluid port 20 is formed centrally in the second end face 18 of the valve housing 12 and can serve as inlet for a first fluid. The two other fluid ports 22, 24 are formed in a shell surface 26 of the valve housing 12, wherein the second fluid port 22 likewise can serve as an inlet for a second fluid. The third fluid port 24 on the other hand can be an outlet. Alternatively, the same fluid can be supplied to the valve 10 via the two fluid ports 20, 22. Furthermore, the third fluid port 24 can serve as inlet and the two other fluid ports 20, 22 can serve as outlets. This depends on the respective installation and application situation.

In the second end face 18 of the valve housing 12 two actuation openings 28 moreover are provided, which each are arranged eccentrically to and symmetrically around the center of the second end face 18. FIG. 1 furthermore shows that an alignment opening 29 is formed in the valve drive 14, which is formed on aside of the valve drive 14 facing away from the valve housing 12. The functions of the actuation openings 28 and the alignment opening 29 will be explained below with reference to the sectional representation of FIGS. 3 to 5.

Figure 3:
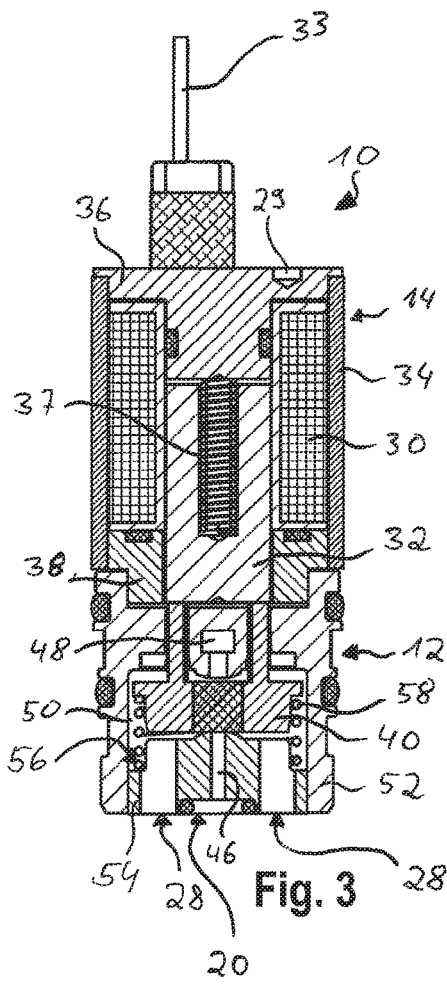
FIG. 3 shows a sectional view of the valve according to the invention as shown in FIGS. 1 and 2.
Figure 4:
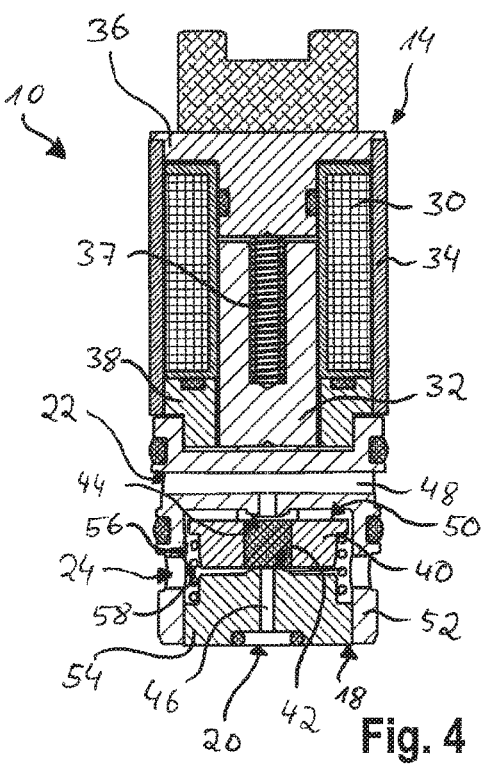
FIG. 4 shows a sectional view of the valve according to the invention as shown in FIGS. 1 and 2 in another sectional plane.

In FIGS. 3 and 4 the valve 10 is shown in a sectional representation, wherein the two Figures differ from each other in their sectional plane, as the valve 10 is rotated by about 90°.

The valve drive 14 is an electromagnetic drive which includes a coil 30 and a movable armature 32 that can axially be shifted when the coil 30 is energized. For this purpose electrical contacts 33 are provided at the valve drive 14, via which the coil 30 is supplied with a current.

Furthermore, the valve drive 14 includes a housing 34 surrounding the coil 30 and the movable armature 32, which is coupled with a stationary armature 36. The stationary armature 36 is made of a magnetizable material, so that a magnetic field generated by the coil 30 is closed via the same.

Between the stationary armature 36 and the movable armature 32 a return spring 37 is provided, which creates a mechanical coupling between the two armatures 32, 36. The return spring 37 urges the movable armature 32 into its starting position in which the movable armature 32 is spaced from the stationary armature 36.

The valve drive 14 in addition has a pole ring 38 via which the valve drive 14 rests against the valve housing 12. The pole ring 38 is formed ring-shaped and encloses the movable armature 32. The pole ring 38 also is made of a magnetizable material and likewise serves to close the magnetic flux in the valve drive 14.

Via the movable armature 32 the valve drive 14 cooperates with a closing element 40 provided in the valve housing 12, in order to axially shift the same within the valve housing 12, as will yet be explained below. The closing element 40 preferably is formed rotationally symmetrical (see FIGS. 6 and 7).

In the embodiment shown, the valve housing 12 includes two valve seats 42, 44 on which the closing element 40 rests in the corresponding closed positions (see FIG. 4). The two valve seats 42, 44 each are associated to a first flow channel 46 and a second flow channel 48, which are formed in the valve housing 12. The first flow channel 46 extends parallel to the shifting movement of the closing element 40, whereas the second flow channel 48 extends vertically to the shifting movement. In this way, a compact construction of the valve housing 12 and of the valve 10 can be achieved.

The first flow channel 46 opens into the first fluid port 20, whereas the second flow channel 48 open into the second fluid port 22. Via the two fluid ports 20, 22 and the flow channels 46, 48 in flow connection therewith a fluid can each be supplied to the valve 10.

Due to the arrangement and alignment of the two flow channels 46, 48 it is possible that the fluid ports 20-24 can be arranged on different surfaces of the valve housing 12, for example on the second end face 18 and the shell surface 26.

The valve 10 furthermore includes a valve chamber 50 (FIG. 4) in which the closing element 40 is axially shiftably arranged. In the embodiment shown the valve chamber 50 is formed in the valve housing 12. The two valve seats 42, 44 are associated to the valve chamber 50 and create the flow connection between the valve chamber 50 and the two first fluid ports 20, 22.

The third fluid port 24 likewise is in flow connection with the valve chamber 50, wherein no valve seat is associated to the third fluid port 24. The third fluid port 24 can act as outlet, so that a fluid can flow out of the valve chamber 50 via the third fluid port 24.

Alternatively, the third fluid port 24 can be an inlet for a fluid, and the first and the second fluid port 20, 22 each can be an outlet. Via the closing element 40 and the two illustrated closed positions, the fluid flowing into the valve chamber 50 via the third fluid port 24 correspondingly can be guided into the first flow channel 46 or the second flow channel 48.

In the embodiment shown, the valve housing 12 is formed in two parts and comprises a pot-shaped valve body 52 as well as an insert element 54 which is inserted in a receptacle 56 of the valve body 52, in order to close the "pot" and the valve chamber 50. The insert element 54 for example can be screwed in, plugged in or pressed in. For this purpose, the insert element 54 in particular can be formed as a plug.

When the insert element 54 is inserted into the receptacle 56 of the valve body 52, the valve chamber 50 is closed. The insert element 54 thus partly defines the valve chamber 50, wherein the valve chamber 50 furthermore is defined by the valve body 52.

In the embodiment shown, the insert element 54 includes the first fluid port 20 and the adjoining first flow channel 46. Alternatively, the insert element 54 can be formed without such fluid port and flow channel.

There is furthermore provided a spring element 58 which is arranged between the closing element 40 and the insert element 54 and axially pretensions the closing element 40 in direction of the valve drive 14. The spring element 58 for this purpose is accommodated in the valve chamber 50 and with one end supports on a surface of the insert element 54 directed towards the valve chamber 50. With the other end the spring element 58 supports on the closing element 40, in particular on an abutment surface provided therefor. The closing element 40 is urged against the movable armature 32 via the spring element 58. This ensures that the closing element 40 follows the movement of the movable armature 32. A prerequisite for the valve seat 42 to be closed in the fail-safe position is that the spring 37 applies more force than the spring 58 acting in the opposite direction.

FIG. 3 also reveals that the two actuation openings 28 are formed in the insert element 54 and extend through the entire insert element 54 up to the valve chamber 50 (see FIG. 3). It thereby is possible that an operator of the valve 10 has access to the closing element 40 arranged in the valve housing 12 from outside.

Figure 5:
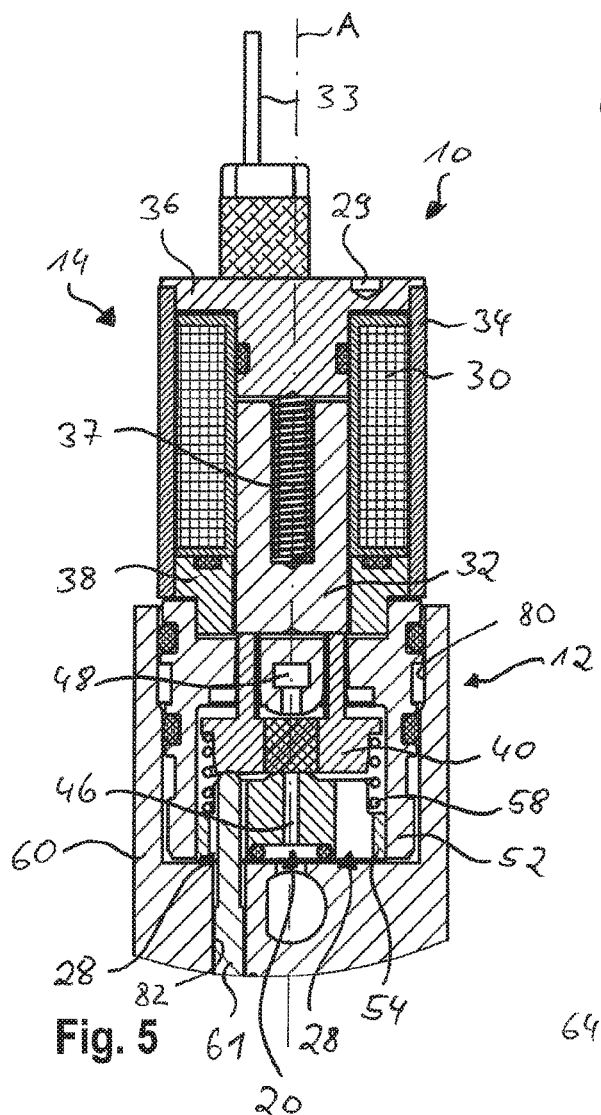
FIG. 5 shows the valve according to the invention as shown in FIG. 3 within a valve assembly, wherein an actuating element is inserted, in order to actuate the closing element.

FIG. 5 shows a valve assembly which comprises the previously shown and described valve 10 as well as a receiving body 60. The receiving body 60 not only can include the one valve 10, but rather a plurality of valves, if necessary. For accommodating the one or more valves, one or more receiving openings 80 are provided, into which the one or more valves 10 simply are plugged or also screwed in.

In the receiving body 60 fluid ports can be provided, which transition into the above-mentioned fluid ports 20-24 and 46. In the receiving body 60 a combined alignment and actuation opening 82 furthermore is provided, which in the case of a correct rotational alignment with the valve 10 relative to the middle axis A of the valve 10 is aligned with one of the actuation openings 28 and is positioned eccentrically to the middle axis A which coincides with the middle axis of the receiving opening 80.

Before inserting the valve 10 from above into the receiving opening 80, an alignment pin is introduced from below through the alignment and actuation opening 82, which pin extends into the receiving opening 80 and protrudes to the inside. The alignment pin has an outside diameter which exactly corresponds to the inside diameter of the alignment and actuation opening 82 and to the actuation opening 28 of the same diameter. When inserting the valve 10, the same is aligned in circumferential direction such that the actuation opening 28 accommodates the alignment pin. When the valve 10 then is completely inserted into the receiving opening 80, it is ensured that the valve 10 is aligned exactly with respect to the receiving body 60 in direction of rotation around the axis A. Hence, for example all connecting parts protruding off-center relative to the axis A, such as the electrical contacts 33, likewise are aligned exactly. This also applies for the fluid ports.

After this installation, a pin-shaped operating element 61 instead of the alignment pin is put through the alignment and actuation opening 82 and the actuation opening 28. The operating element 61 has a slightly tapered end with a diameter which is slightly smaller than the diameter of the alignment and actuation opening 82 and the actuation opening 28.

The operating element 61 extends up to the closing element 40, so that the operating element 61 contacts the closing element 40 (see FIG. 5). The receiving body 60 preferably is formed such that it seals the at least one actuation opening 28. In general, it thereby is possible that in the assembled condition of the valve 10 the closing element 40 can be actuated, i.e. switched manually.

Due to the two eccentrically arranged actuation openings 28, the valve 10 can easily be aligned in the receiving body 60. The two actuation openings 28 in particular can be arranged symmetrically distributed with respect to the center of the second end face 18 (see FIG. 2).

Alternatively or in addition, the valve 10 can be aligned via the alignment opening 29 formed in the valve drive 14. For this purpose, the valve drive 14 is rotatorily aligned with respect to the valve housing 12 and the closing element 40 arranged therein.

As mentioned, the rotatory alignment inter alia is important when the electrical contacts 33 should have a particular orientation with respect to the actuation openings 28 (operating element 61).

Figure 6:
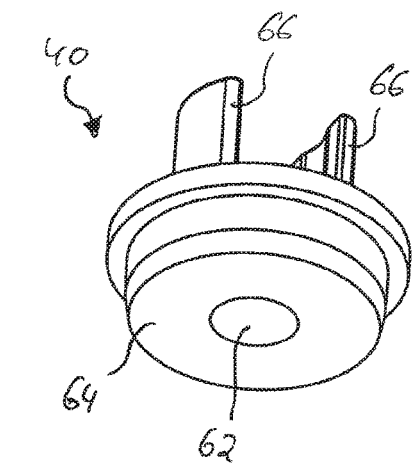
FIG. 6 shows a perspective view of a closing element used.
Figure 7:
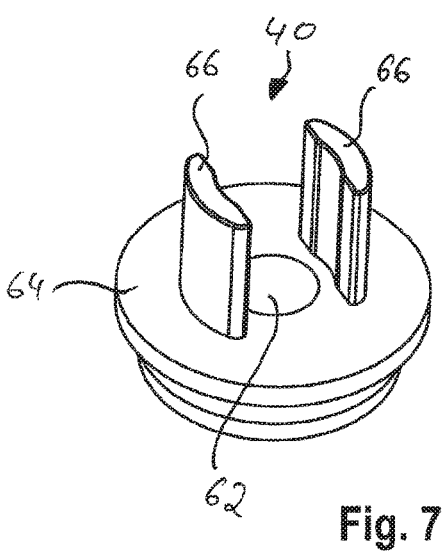
FIG. 7 shows a further perspective view of the closing element of FIG. 6.

In FIGS. 6 and 7 the closing element 40 is shown in two different perspective representations. The closing element 40 includes a first portion 62 which is formed centrally and symmetrically, in particular circularly cylindrical.

In the embodiment shown, the first portion 62 extends up to two opposite surfaces of the closing element 40. Furthermore, the first portion 62 is annularly surrounded by a second portion 64 which encloses the first portion 62 like a jacket.

The two portions 62, 64 are formed of different materials, as can also be taken in particular from the sectional representations in FIGS. 3 to 5. The first portion 62, which extends to the opposite surfaces, cooperates with the two valve seats 42, 44 in the assembled condition of the valve 10. Therefore, the first portion 62 is formed of a material which has a higher elasticity. For example, the first portion 62 can be made of a sealing material. It thereby is ensured that the closing element 40 tightly closes the respective valve seat 42, 44, when it is in the corresponding closed position.

The second portion 64 on the other hand is made of a material which has a lower elasticity and thus is stiffer, e.g. metal, plastics. The entire closing element 40 thereby is provided with a stiffness, so that it does not bend when a force is exerted. This facilitates in particular the alignment of the closing element 40 over the receiving body 60.

According to the illustrated embodiment, the closing element 40 furthermore includes two protruding coupling elements 66 which are formed integrally with the second portion 64. The coupling elements 66 are arranged eccentrically and symmetrically around the middle axis A on the surface of the closing element 40 associated to the valve drive 14. The coupling elements 66 vertically protrude from this surface and extend in direction of the valve drive 14 which they contact with their free ends.

The movable armature 32 of the valve drive 14 cooperates with the coupling elements 66, in order to transmit the force exerted by the valve drive 14 to the closing element 40, so that the closing element 40 can axially be shifted against the pressure of the spring element 58. For this purpose, the movable armature 32 rests against the closing element 40 during the shifting movement. The bottom of the pot-shaped valve body 52 has correspondingly shaped openings through which the coupling elements 66 extend. Merely in the closed position of the second valve seat 44, when the movable armature 32 rests against the stationary armature 36, the movable armature 32 does not rest against the closing element 40. In this closed position, the closing element 40 is urged against the second valve seat 44 only via the spring element 58.

The coupling elements 66 are eccentrically arranged on the closing element 40 such that they extend laterally from the second valve seat 44 past the second valve seat 44 in direction of the valve drive 14.

In an alternative embodiment not illustrated here, the coupling elements 66 can be formed integrally on the movable armature 32, so that the coupling elements 66 exert the force on a planar surface of the closing element 40. Furthermore, the movable armature 32 can act directly on a substantially planar surface of the closing element 40, in order to axially shift the same.

The cartridge valve 10 manufactured in this way has a diameter of 2 mm to 15 mm, in particular 9 mm, and a length of 5 mm to 30 mm, in particular 19.7 mm. Furthermore, the valve drive 14 has a length of 2 mm to 20 mm, in particular 11 mm. The closing element 40 has a diameter of 2 mm to 15 mm, in particular 6 mm, whereas the first portion 62 has a diameter of 0.5 mm to 5 mm, in particular 1.5 mm.

The valve 10 and the components used therein in particular are formed rotationally symmetrical.

What is claimed:

1. A valve comprising a valve housing with at least one fluid port, wherein the valve is a cartridge valve, wherein the valve housing is formed rotationally symmetrical, and in the valve housing a valve chamber is formed in which a closing element axially shiftable by a valve drive is provided, wherein the closing element cooperates with at least one valve seat provided in the valve housing, and wherein the valve housing includes a first end face to which the valve drive can be coupled, and at least one actuation opening in a second end face of the valve housing, wherein the second end face is an outer face and is opposite to the first end face, which extends through the valve housing up to the closing element and is arranged eccentrically in the second end face wherein one of the at least one fluid port is centrically arranged on the second end face, which in the closed condition is closed by the closing element, wherein the fluid port centrically arranged on the second end face and the at least one actuation opening run parallel to each other.

2. The valve according to claim 1, wherein the valve housing includes at least one first flow channel which extends parallel to the shifting direction of the closing element.

3. The valve according to claim 1, wherein the valve housing includes at least one second flow channel which extends vertically to the shifting direction of the closing element.

4. The valve according to claim 1, wherein the valve housing comprises an insert element and a valve body which has a receptacle in which the insert element is inserted.

5. The valve according to claim 2, wherein the valve housing comprises an insert element and a valve body which has a receptacle in which the insert element is inserted, and wherein the at least one first flow channel is formed in the insert element.

6. The valve according to claim 3, wherein the valve housing comprises an insert element and a valve body which has a receptacle in which the insert element is inserted, and wherein the at least one second flow channel is formed in the valve body.

7. The valve according to claim 4, wherein the at least one actuation opening is provided in the insert element and extends up to the valve chamber.

8. The valve according to claim 1, wherein the closing element includes a first portion and a second portion, wherein the first portion is formed centrally and symmetrically and can contact the valve seat.

9. The valve according to claim 8, wherein the first portion of the closing element is formed of a first material and the second portion of the closing element is formed of a second material.

10. The valve according to claim 1, wherein the closing element includes at least one coupling element via which the valve drive can drive the closing element, in order to shift the closing element.

11. The valve according to claim 10, wherein a plurality of coupling elements are provided which are arranged symmetrically distributed on a surface of the closing element facing the valve drive and vertically protrude from this surface.

12. The valve according to claim 1, wherein two valve seats are provided, between which the closing element is axially shiftably arranged.

13. The valve according to claim 12, wherein the valve seats are arranged opposite each other in the valve chamber.

14. The valve according to claim 1, wherein the closing element is pretensioned into a starting position via a spring element.

15. The valve according to claim 14, wherein the closing element is urged against the valve drive.

16. The valve according to claim 1, wherein the valve drive is coupled with the closing element.

17. The valve according to claim 16, wherein the valve drive is an electromagnetic drive which comprises a coil and a movable armature which cooperates with the closing element.

18. The valve according to claim 1, wherein the valve has a diameter between 2 mm and 15 mm.

19. A valve assembly, comprising a valve and a receiving body, which valve is a cartridge valve, wherein the valve comprises a valve housing with at least one fluid port, wherein the valve housing is formed rotationally symmetrical, and in the valve housing a valve chamber is formed in which a closing element axially shiftable by a valve drive is provided, wherein the closing element cooperates with at least one valve seat provided in the valve housing, and wherein the valve housing includes a first end face to which the valve drive can be coupled, and at least one actuation opening in a second end face of the valve housing, wherein the second end face is an outer face and is opposite to the first end face, which extends through the valve housing up to the closing element and is arranged eccentrically in the second end face, wherein one of the at least one fluid port is centrically arranged on the second end face, which in the closed condition is closed by the closing element, and wherein the receiving body accommodates a valve, includes a receiving opening for the valve as well as the fluid port centrically arranged on the second end face, wherein the receiving body has a combined alignment and actuation opening which in the aligned condition of the valve within the receiving opening is aligned with the actuation opening of the valve.

20. A valve comprising a valve housing with at least one fluid port, wherein the valve is a cartridge valve, wherein the valve housing is formed rotationally symmetrical, and in the valve housing a valve chamber is formed in which a closing element axially shiftable by a valve drive is provided, wherein the closing element cooperates with at least one valve seat provided in the valve housing, and wherein the valve housing includes a first end face to which the valve drive can be coupled, and at least one actuation opening in a second end face of the valve housing, wherein the second end face is an outer face and is opposite to the first end face, which extends through the valve housing up to the closing element and is arranged eccentrically in the second end face wherein at least one of the at least one actuation opening is an alignment opening via which the valve is rotatory aligned by introducing an alignment pin from below through the alignment opening when the valve is inserted in a receiving opening of a receiving body.

* * * * *